United States Patent Office 3,151,396
Patented Oct. 6, 1964

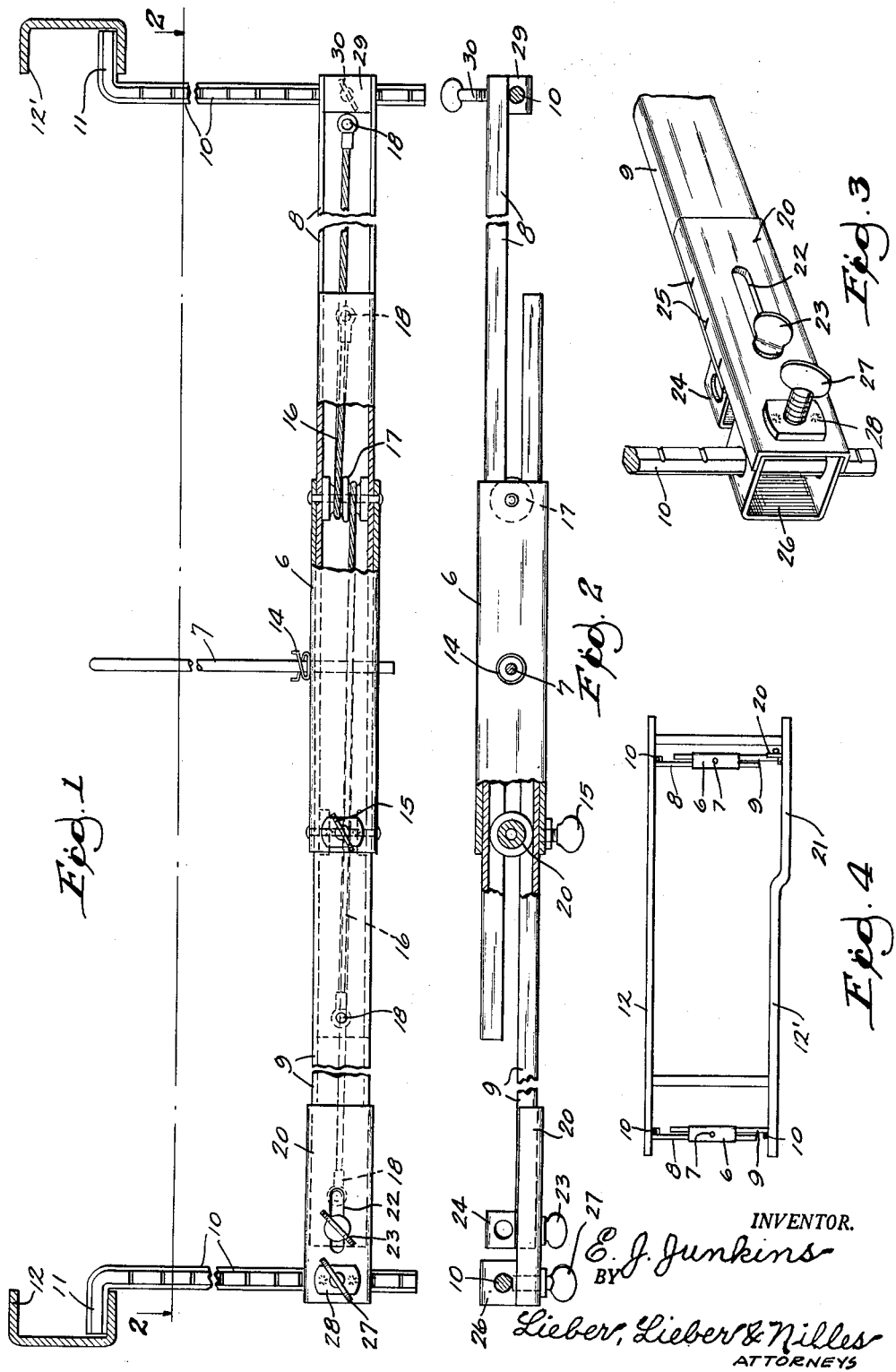

3,151,396
VEHICLE FRAME GAUGE
Edmund James Junkins, Brookfield, Wis., assignor to Applied Power Industries, Inc., a corporation of Wisconsin
Filed Oct. 2, 1961, Ser. No. 142,072
2 Claims. (Cl. 33—74)

The present invention relates generally to improvements in the art of checking the condition of various parts of motor vehicles or the like, and it relates more specifically to improvements in the construction and operation of vehicle frame gauges for detecting the location of the central longitudinal planes of certain types of vehicle frames.

The primary object of this invention is to provide an improved vehicle frame gauge which is simple in construction and flexible in its adaptations.

In the manufacture and maintenance of motor driven vehicles, it is necessary to accurately check and locate the longitudinal central planes of the chassis or main frames in order to effect proper assembly and functioning of various parts of the vehicle propelling, supporting, and guiding mechanisms. Many different types of gauges for effecting such checking have heretofore been proposed and used commercially with moderate success when applied to standard automobile frames having opposite side beams disposed symmetrically relative to the central frame planes, such as frames having either parallel or similarly oppositely inclined opposed rectilinear or straight side beams.

Perhaps the most practical of these prior gauges are of the type wherein spaced hangers are adapted to be suspended from the side beams of a frame and are fixedly attached to the outer ends of simultaneously longitudinally movable parallel bars which are guided for such movement in a tubular housing carrying an indicating pointer or rod always disposed midway between the hangers regardless of the width of the frame. While these prior gauging devices perform their intended function on such standard symmetrical frames in a relatively satisfactory manner, the recent introduction of modified frame structures especially for so-called "compact" cars and wherein the side beams of the frames are non-symmetrical has made the previous gauges impractical for the purpose of accurately and automatically locating the central longitudinal planes of such frames.

It is therefore an important object of the present invention to provide an improved frame gauge assemblage which is adapted to effectively and automatically check and locate the central longitudinal planes of unsymmetrical vehicle chassis or frames.

Another important object of this invention is to provide an improved automobile frame gauging device of the type having simultaneously oppositely movable hangers cooperable with the side beams of frames, which is adapted to accurately locate the central plane of frames having irregular or non-symmetrical opposite side beams.

A further important object of the invention is to provide a simple attachment applicable to vehicle frame gauges which is capable of checking only the central longitudinal planes of symmetrical frames, in order to also adapt such gauges for use in checking unsymmetrical frame structures.

Still another important object of the present invention is to provide a compact and conveniently manipulable automobile frame gauge which can be effectively utilized to check and locate the central longitudinal planes of diverse types of vehicle frames regardless of irregularities in the side beams of such frames.

These and other more specific objects and advantages of the invention will be apparent from the following detailed description.

A clear conception of the features constituting the present improvement, and of the construction and functioning of a typical commercial automobile frame gauge embodying the invention, may be had by referring to the drawing accompanying and forming a part of this specification wherein like reference characters designate the same or similar parts in the various views:

FIG. 1 is a fragmentary elevation of an assembled vehicle frame gauge showing the same applied to the opposite side beams of an unsymmetrical frame, a portion of the gauge housing having been broken away to more clearly reveal normally hidden parts;

FIG. 2 is a transverse horizontal section through the same gauge assembly, taken along the line 2—2 of FIG. 1;

FIG. 3 is an enlarged perspective view of the present improved attachment for enabling the gauge to be used to locate the central vertical planes of unsymmetrical vehicle frames; and FIG. 4 is a diagrammatic top view showing several of the improved gauges applied to a non-symmetrical vehicle frame.

While the invention has been shown and described as having been applied to a frame gauge of a particular type wherein the centering bars are simultaneously movable in opposite directions by cables or cords coacting with rollers, it is not intended to confine its use to such gauge assemblages; and it is also contemplated that specific descriptive terms be given the broadest interpretation consistent with the disclosure.

Referring to the drawing, the particular vehicle frame gauge shown therein comprises in general, a tubular housing 6 having thereon an upright pointer or centering rod 7; a pair of elongated parallel bars 8, 9 which are simultaneously longitudinally movable in opposite directions within the housing 6 whenever one of these bars is forcibly displaced toward or away from the rod 7; and an upstanding hanger 10 associated with the end of each bar 8, 9 remote from the housing 6, each hanger 10 having its upper end 11 off-set for suspension from one of the opposite channel shaped side beams 12, 12' of a vehicle as depicted in FIG. 1.

The centering rod 7 may be adjusted vertically relative to the housing 6 and clamped in adjusted position with the aid of a special speed nut 14, and this rod 7 may be caused to project either from the top or bottom of the housing, see FIGS. 1 and 2. The bars 8, 9 are rectilinear channels freely slidably cooperable with the interior of the housing 6 when released, but these bars are adapted to be firmly held in adjusted position relative to each other and to the housing by means of a thumb screw 15. In order to cause the bars 8, 9 to move simultaneously in opposite longitudinal directions when a pulling or pushing force is applied to either bar, the outer end portions of both bars are connected by cables or cords 16 with a grooved roller 17 rotatably mounted within one end of the housing 6, and these cords are wrapped around the roller grooves and have their opposite ends attached to both bars 8, 9 by fittings 18 as shown in FIG. 1 so as to always maintain the cords in taut condition.

The sheave roller 17 cooperates with another idler roller 20 also rotatably mounted within the housing 6 to guide the bars 8, 9 while being adjusted longitudinally, and in accordance with the present invention the outer end of at least one of the bars 8, 9 is provided with a special adapter 20 for varying the effective bar length. This feature is shown in FIGS. 1, 2, and 3 and enables the gauge to be utilized to centralize and aline the rods 7 of several gauges applied to an unsymmetrical frame as depicted in FIG. 4. The special adapter 20 comprises a channel shaped member slidably engageable with the free end of either of the bars 8, 9, the bar 9 having been specifically selected for purposes of illustration, and the side beam 12' of the irregular frame specifically shown has an off-set 21 at one end while the opposite side beam 12 is straight throughout its entire length.

The channel shaped adapter 20 is provided with a side slot 22 with which a thumb screw 23 coacting with a special nut 24 is cooperable to lock the adapter in various adjusted positions along the bar 9 as defined by indicia 25 spaced predetermined distances apart equal to the extent of the off-sets 21 or irregularities of various unsymmetrical frames. The outer end portion of the adapter 20 beyond the end of the bar 9 has a sheet metal hanger receiving element 26 firmly attached thereto, and the adjacent hanger 10 is capable of being locked in various vertically adjusted positions to the element 26 by means of another thumb screw 27 coacting with a nut 28 rigidly secured to the adapter 20. While an adapter 20 may also be thus applied to the outer end of the other bar 8 remote from the housing 6, this is not necessary if one side beam 12 of the frame is straight and parallel to the central vertical plane of the frame assemblage. As shown, this outer end of the bar 8 is therefore merely provided with a hanger attaching element 29 capable of being locked to the adjacent hanger 10 in various vertically adjusted positions by means of a thumb screw 30.

When the improved frame gauge has been properly constructed and assembled as above described, it may be utilized with either symmetrical or non-symmetrical vehicle frames to locate or check the central vertical planes of such frames. For example, if the gauge is to be used to check an unsymmetrical frame such as shown in FIG. 4, one of the gauges having its adapter set so as to position the centering rod 7 thereof equi-distant from both hangers 10 thereof may be applied to the left end of the frame, but another gauge having its adapter 20 adjusted outwardly a distance exactly equal to the extent of the lower frame beam off-set 21 should be applied to the right end of the frame. This will automatically accurately locate both gauge rods 7 precisely in the vertical longitudinal central plane of the frame so that the proper disposition of the various vehicle parts relative to this plane can be readily checked by sighting along the alined rods 7 or by connecting these rods with a chalk line or the like.

While the off-set 21 of the frame illustrated is parallel to the remainder of the beam 12', the improved gauge may obviously be utilized to check the location of the central planes of other types of frames having diverse irregularities or off-sets on both side beams. The adapter 20 may obviously be quickly and accurately adjusted to effect such checking by merely measuring the extent of such irregularities or off-sets and by setting the adapter 20 so as to elongate the bar 8 or 9 accordingly, but by positioning the adapter so as to position both hangers like distances from the centering rod 7, the improved gauge can also be utilized to check symmetrical frames.

The invention has proven highly satisfactory and successful in actual use, and the adapter 20 is simple and easily manipulable to produce precision results.

Various modes of carrying out the invention are contemplated as being within the scope of the following claims particularly pointing out and distinctly claiming the subject matter which is regarded as the invention:

1. A vehicle frame gauge compirsing an elongated housing having a centering rod projected laterally therefrom and alinable with the normal longitudinal center line of a vehicle frame, a pair of bars simultaneously longitudinally movable in unison in opposite directions along said housing toward and away from said rod, an adapter adjustably secured to the free outer end of one of said bars for varying the length thereof, a hanger projecting laterally from said adapter and another hanger projecting laterally from the end of the other of said bars remote from said housing, each of said hangers being formed for suspension from a side beam of the vehicle frame, said adapter being adjustable longitudinally of its said bar to independently vary the distance of the hanger carried thereby from said centering rod and thus compensate for any offset in the side beam of the vehicle frame, whereby said rod will automatically locate itself on the normal longitudinal center line of an unsymmetrical frame.

2. A vehicle frame gauge according to claim 1, wherein the adapter is formed with a longitudinal slot and its bar is provided with attachment means received by the slot for effecting the longitudinal adjustments.

References Cited in the file of this patent

UNITED STATES PATENTS

| | | |
|---|---|---|
| 597,915 | Roosa | Jan. 25, 1878 |
| 2,000,866 | Smith | May 7, 1935 |
| 2,070,518 | Smith | Feb. 9, 1937 |
| 2,481,420 | Hanson | Sept. 6, 1949 |
| 2,575,194 | Smith | Nov. 13, 1951 |
| 2,581,021 | Jacobson | Jan. 1, 1952 |

FOREIGN PATENTS

| | | |
|---|---|---|
| 681,884 | France | Feb. 4, 1930 |